US006983320B1

(12) United States Patent
Thomas et al.

(10) Patent No.: US 6,983,320 B1
(45) Date of Patent: Jan. 3, 2006

(54) SYSTEM, METHOD AND COMPUTER PROGRAM PRODUCT FOR ANALYZING E-COMMERCE COMPETITION OF AN ENTITY BY UTILIZING PREDETERMINED ENTITY-SPECIFIC METRICS AND ANALYZED STATISTICS FROM WEB PAGES

(75) Inventors: Jason B. Thomas, Arlington, VA (US); Mark J. Bildner, Alexandria, VA (US); Brandy M. Thomas, Arlington, VA (US); Christopher D. Young, Washington, DC (US); Richard P. Moore, Potomac Falls, VA (US); Ross A. Biro, Alexandria, VA (US); Alissa S. Pemberton, Washington, DC (US); Diane B. Perlman, Silver Spring, MD (US)

(73) Assignee: Cyveillance, Inc., Arlington, VA (US)

( * ) Notice: Subject to any disclaimer, the term of this patent is extended or adjusted under 35 U.S.C. 154(b) by 0 days.

(21) Appl. No.: 09/576,895

(22) Filed: May 23, 2000

(51) Int. Cl.
 *G06F 15/173* (2006.01)
(52) U.S. Cl. ...................... 709/224; 709/203; 709/219; 707/5; 707/10
(58) Field of Classification Search ................ 709/218, 709/223–224, 203, 217, 219; 707/1, 3, 5, 707/10; 702/2
 See application file for complete search history.

(56) References Cited

U.S. PATENT DOCUMENTS 5,659,732 A * 8/1997 Kirsch ............................ 707/5
5,931,907 A * 8/1999 Davies et al. ................ 709/218
5,933,822 A * 8/1999 Braden-Harder et al. ....... 707/5
5,963,965 A * 10/1999 Vogel ....................... 715/501.1
5,974,457 A * 10/1999 Waclawsky et al. ......... 709/224
6,078,866 A * 6/2000 Buck et al. ..................... 702/2
6,088,676 A * 7/2000 White, Jr. ...................... 705/1
6,178,419 B1 * 1/2001 Legh-Smith et al. .......... 707/6
6,289,341 B1 * 9/2001 Barney .......................... 707/6
6,321,228 B1 * 11/2001 Crandall et al. .............. 707/10
6,377,961 B1 * 4/2002 Ryu ............................... 707/7
6,442,606 B1 * 8/2002 Subbaroyan et al. ........ 709/224
6,480,835 B1 * 11/2002 Light ............................. 707/3
6,480,837 B1 * 11/2002 Dutta ............................ 707/3
2001/0044795 A1 * 11/2001 Cohen et al. .................. 707/5
2003/0149684 A1 * 8/2003 Brown et al. .................. 707/1
2003/0182212 A1 * 9/2003 Moscone et al. ............. 705/30

OTHER PUBLICATIONS

Giladi et al., "SPEC as a Performance Evaluation Measure", IEEE, 1995.★ ☐☐.*

* cited by examiner

Primary Examiner—Bharat Barot
Assistant Examiner—Oanh Duong
(74) Attorney, Agent, or Firm—DLA Piper Rudnick Gray Cary US LLP

(57) ABSTRACT

A system, method and computer program product for analyzing e-commerce competition is disclosed. The method involves collecting pages that are commonly transmitted over a computer network (e.g., the Internet, an institutional intranet, etc.), collecting external data, which may or may not be available on the computer network, processing the collected pages and content, and scoring the pages based on all the information collected to determine statistics. The statistics are analyzed for providing benchmarks that compare an entity's presence on the computer network and compares it to the presence of other entities.

11 Claims, 16 Drawing Sheets

Score Words

| NONCE 604 | WORD 606 | VERSION 608 | COMMENT 610 | EDIT 612 | ATTRUBUTES 614 | COMPANY NAME 630 | BRAND NAME 632 | DOMAIN NAME 634 |
|---|---|---|---|---|---|---|---|---|
| | | | | | | | | |
| | | | | | | | | |
| SHOW DEBUG INFO 616 | | RESET 618 | SUBMIT 620 | | SEARCH ENGINE KEYWORD 636 | | | |
| SCORE NAME 622 | | PRIMARY PAGE SCORE 626 | BOOST POINTS 628 (optional) | | | | | |
| | | | | | | | | |
| | | | | | | | | |
| | | | | | | | | |

FIG. 6

Score Formula

| NONCE 704 | FORMULA 706 | VERSION 708 | OPERATIONAL-ORDER 710 | COMMENT 712 | EDIT 714 |
|---|---|---|---|---|---|
|  |  |  |  |  |  |
|  |  |  |  |  |  |

Edit Formula

| ADD 716 | MODIFY 718 | DELETE 720 | ACTIVE 722 | FUNCTIONS 724 | E-TYPES 726 | MIME TYPES 728 | TOP-LEVEL DOMAIN TYPES 730 |
|---|---|---|---|---|---|---|---|
|  |  |  |  |  |  |  |  |
|  |  |  |  |  |  |  |  |

INPUT BOX
732

ATTRIBUTES
734

FIG. 7

Global Score Words & Groups 802

| WORDS 804 | | | GROUPS 806 | | |
|---|---|---|---|---|---|
| NONCE 808 | VERSION 810 | ATTRIBUTES 812 | NONCE 814 | VERSION 816 | ATTRIBUTES 818 |
| | | | | | |
| | | | ... | | |
| | | | | | |

Global Score Formula 803

| NONCE 820 | VERSION 822 | OPERATION-ORDER 824 | COMMENT 826 | EDIT 828 | ATTRIBUTES 830 |
|---|---|---|---|---|---|
| | | | | | |
| | | | | | |

FIG. 8A

| Score word 854 | Nonce 858 | Version 860 | Comment 862 | Human Readable 864 | Full Word (optional) 866 |
|---|---|---|---|---|---|
| Add a Word... 856 | Case Sensitive (optional) 868 | Regular Expression (optional) 870 | RegEx Help (optional) 872 | RegEx Translation (optional) 874 | |

Attributes 830

FIG. 8B

| Executive Summary 902 | e-Business Index 904 | Data Summary 908 | Printable Report 910 | Help 912 |
|---|---|---|---|---|
| | Index Categories 1014 | | Index Listing 1016 | |
| | - Component<br>- Component<br>- Component<br>- Component<br>- Component<br>1018 | | Opinion<br>Search Engine<br>E-Commerce<br>Links to Site<br>Misdirection<br>Top 100<br>Ad Coverage<br>Name In....<br>Snapshot Of....<br>1020 | |

| Executive Summary 902 | e-Business Index 904 | Data Summary 908 | Printable Report 910 | Help 912 |
|---|---|---|---|---|
| Index Categories 1014 | | Overall Score 1036 | | |
| - Component<br>- Component<br>- Component<br>- Component<br>- Component 1018 | | Graph 1037 | | |

FIG. 10B

| Executive Summary 902 | e-Business Index 904 | Data Summary 908 | Printable Report 910 | Help 912 |
|---|---|---|---|---|
| Index Categories 1014 | | Metatag Use 1046 | | |
| - Component<br>- Component<br>- Component<br>- Component<br>- Component 1018 | | Graph 1047 | | |

| Executive Summary 902 | e-Business Index 904 | Data Summary 908 | Printable Report 910 | Help 912 |
|---|---|---|---|---|
| Index Categories 1014 | | Historical Use 1056 | | |
| | | Graph 1057 | | |
| 1018 | | | | |
| - Component | | | | |
| - Component | | | | |
| - Component | | | | |
| - Component | | | | |
| - Component | | | | |

SYSTEM, METHOD AND COMPUTER PROGRAM PRODUCT FOR ANALYZING E-COMMERCE COMPETITION OF AN ENTITY BY UTILIZING PREDETERMINED ENTITY-SPECIFIC METRICS AND ANALYZED STATISTICS FROM WEB PAGES

CROSS-REFERENCE TO RELATED APPLICATION

This application is related to the following commonly owned, co-pending applications:

"System, Method and Computer Program Product for an Online Monitoring Search Engine", by Thomas, having application Ser. No. 09/133,374, filed on Aug. 13, 1998, which is incorporated herein by reference in its entirety; and "System, Method and Computer Program Product for Developing and Interpreting E-Commerce Metrics", by Thomas et al., having application Ser. No. 09/576,896, filed concurrently herewith, which is incorporated herein by reference in it entirety.

BACKGROUND OF THE INVENTION

1. Field of the Invention

The invention relates generally to computer network search engines, and more particularly to search engines for performing online monitoring activities.

2. Related Art

Over the past several years, there has been a large growth in the number of computers, and thus people, connected to the global Internet and the World-Wide Web (WWW). This collective expansion allows computer users to access various types of information, disseminate information, and be exposed to electronic (e-commerce) commerce activities, all with a great degree of freedom. E-commerce includes entities such as large corporations, small businesses, individual entrepreneurs, organizations, and the like who offer their information, products, and/or services to people all over the world via the Internet.

The rise in use of the Internet, however, also has a negative side. Given the Internet's vastness and freedom, many unscrupulous companies, organizations and individuals have taken the opportunity to profit by diverting customer traffic, misusing product information, and mis-associating their product or company with others. For example, it has been estimated that millions of pages employ tags and text designed to divert searchers to their sites when the Internet users actually searched for something else. These diversions and incidents of misinformation cause a loss of business. Also, an individual, company, organization, or the like may be concerned with other violations such as the illegal sale of their products, or the sale of inferior products using their brand names. Furthermore, an individual, a company, an organization, or the like may be concerned with false information (i.e., "rumors") that originate and spread quickly over the Internet, resulting in the disparagement of the entity. Such entities may also be interested in gathering data about how they and their products and/or services are perceived on the Internet (i.e., a form of market research).

Additionally, entities need to know what kind of presence they have on the Internet. Entities need to have a way of measuring their products, brands, etc. against those of other entities, either in the same market or across markets. Without such information, entities would not know their competition, opportunities, and/or how their market is changing.

In order to compete with the above-described aspects of the Internet, entities are currently forced to search Internet resources (i.e., Web sites, File Transfer Protocol (FTP) sites, newsgroups, chat rooms, etc.), by visiting over thousands of sites in order to discern activities relevant to their business operations. Such searching is currently done either by hand or using commercial search engines. Each of these methods is costly because a great amount of time is required to do such searching—time that detracts from positive, profit-earning activities. Adding to the frustration of discerning relevant activity is the fact that commercial search engines are updated infrequently and typically limit the resulting number of sites (i.e., "hits") that any given search request returns. Furthermore, the task of visiting each site to determine whether there is indeed relevant activity and if so, the extent and character of it, also demands a great deal of time.

Therefore, in view of the above, what is needed is a system, method and computer program product for analyzing e-commerce competition. E-commerce competition includes the products and services of other entities, the Internet presence of other entities, the relationships of entities across product and service areas, etc. Such an analysis of e-commerce competition would provide relevant market information and feedback to an entity so that it may detect and prioritize its online business efforts. Further, what is needed is a system, method and computer program product that searches the Internet's vast resources for data relevant to the entity's activities and its associates and produces a detailed, customized report of relevant activity affecting the entity.

SUMMARY OF THE INVENTION

The invention is directed to a system, method and computer program product for analyzing e-commerce competition that meets the above-identified needs. The method and computer program product involve collecting pages that are commonly transmitted over a computer network (e.g., the Internet, an institutional intranet, etc.), where the pages are relevant to the business operations of an entity. The method and computer program product also collect external data, which may or may not be available on the computer network, but that is highly relevant to the entity. A list of predetermined, entity-specific criteria is obtained from the external data. A list of rules is generated, where each rule contains at least one of the entity-specific criteria. The method and computer program product determine whether any of the collected pages satisfies any of the listed rules. Matching pages are gathered into a subset for further processing. Additional information is added to the subset of pages. The additional information can be contact information, routing tables, financial information, and other data which does not need to be collected more than once. The method and computer program product score the pages based on all the information collected to determine statistics. The statistics are analyzed for business information which may be important to the operations of the entity. The method and computer program product can be repeated for other entities, where the results are combined in additional benchmarks comparing one entity's operations with others. The method and computer program product then produce a report to deliver a continuous stream of e-commerce intelligence for the entity. Depending on the entity-specific criteria, the method and computer program product can quickly and efficiently benchmark an entity's competitive positioning and Internet presence against its peers. The method and computer program product can also track how products, brands, and/or content are being distributed over the Internet compared to that of peers. They can compare the overall reach and frequency of an entity, its product, brand, or content on the Internet compared to that of its peers. The method and computer program product can also record positive and negative perceptions of an entity, its product, content or brand on the Internet by tracking opinion or bias of newsgroup postings and Web sites containing forums and/or other commentary on the entity and its peers.

In providing benchmarks for all of the above-mentioned results, the method and computer program product give insight into the entity's image on the Internet and compares them to the images of other entities.

The e-commerce competition system of the present invention includes a downloader for searching a computer network (e.g., the Internet), a page processing module for receiving the pages downloaded from the search of the computer network, the page processing module forming a list of pages. In one embodiment, the system contains numerous downloaders with searching the entire computer network, and searching specific formats (e.g., newsgroups or chat sites). The system also contains an archive for storing the listed pages, the pages being downloaded to the archive by the page processing module, and a database for allowing the page processing module to perform higher order operations on the pages on the list in order to produce a benchmark. Entities use the system to gauge their presence with other entities. In one embodiment, the system also includes a plurality of Internet clients (e.g., Web, e-mail, Wireless Application Protocol (WAP), etc.) that provide a graphical user interface (GUI) for users to enter search criteria, communicate with the downloader and page processing module, and view pages with scoring information, entity statistics, and page contents.

One advantage of the invention is that users may quickly and efficiently search and find relevant information contained on Web, FTP, and File Service Protocol (FSP) sites, as well as chat rooms and newsgroups within the Internet.

Another advantage of the invention is that detailed and customizable reports showing benchmarks comparing an entity with others and thus allowing entities to further focus their business efforts.

Another advantage of the invention is that its back-end (page processing module) and front-end (user interface) are designed to operate independently of each other, thus allowing greater throughput and availability of the system as a whole.

Yet another advantage of the invention is that lists of relevant pages may be grouped and prioritized, both in an automated and manual fashion, in order to arrive at a manageable set of data.

Another advantage of the invention is that entities can compare their Internet presence with other entities in order to better understand their market position and the market in general.

Further features and advantages of the invention as well as the structure and operation of various embodiments of the invention are described in detail below with reference to the accompanying drawings.

BRIEF DESCRIPTION OF THE FIGURES

The accompanying drawings, which are incorporated herein and form a part of the specification, illustrate the invention and, together with the description, further serve to explain the principles of the invention and to enable a person skilled in the pertinent art(s) to make and use the invention.

In the drawings:

FIGS. 6, 7, 8A and 8B are exemplary scoring input pages according to an embodiment of the invention;

FIGS. 9 and 10A–10D are exemplary output report pages according to an embodiment of the invention.

The invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE PREFERRED EMBODIMENTS

TABLE OF CONTENTS

I. Overview
II. System Architecture
III. Software Architecture
IV. Overall E-Commerce Competition System Operation
V. Graphical User Interface (Front-End)
VI. Page Processing Module (Back-End)
VII. Output Reports
VIII. Front-End and Back-End Severability
IX. Environment
X. Conclusion I. Overview The present invention is directed to a system, method, and computer program product for analyzing e-commerce competition. E-commerce competition includes the products and services of other entities, the Internet presence of other entities, the relationships of entities across product and service areas, etc. In one embodiment of the invention, users are entities who are interested in determining their Internet presence and e-commerce competition with a continuous stream of relevant market feedback from the Internet (e.g., relative presence on the Internet in comparison to an entity's competitors, and/or relative reputation with consumers along product and competitor lines). Such entities can employ an intelligent search engine that spans the entirety of the Internet's vast resources, and returns links to Internet sites that, with a high probability of certainty, contain relevant information affecting the entity. The input of the system's search engine can be customized for each entity based on, for example, their products, services, business activity, and/or the type of intellectual property owned. The system's search engine can also provide detailed reports, customized to fit each entity so that the entity may prioritize its activities. In one embodiment, the system also provides a Web server so that entities may remotely utilize the search engine.

While the invention is described in terms of the above example, this is for convenience only and is not intended to limit its application. In fact, after reading the following description, it will be apparent to one skilled in the relevant art(s) how to implement the following invention in alternative embodiments (e.g., providing online monitoring for a corporate intranet or extranet).

Furthermore, while the following description focuses on the monitoring of Web sites, newsgroups, and FTP sites, and thus employs such terms as Universal Resource Locators (URLs), address, Web pages, and content, it is not intended to limit the application of the invention. It will be apparent to one skilled in the relevant art(s) based on the teachings contained herein how to implement the following invention, where appropriate, in alternative embodiments. For example, the invention may be applied to monitoring chat rooms, forums, or mailing lists, etc.

II. System Architecture

Figure 1A:
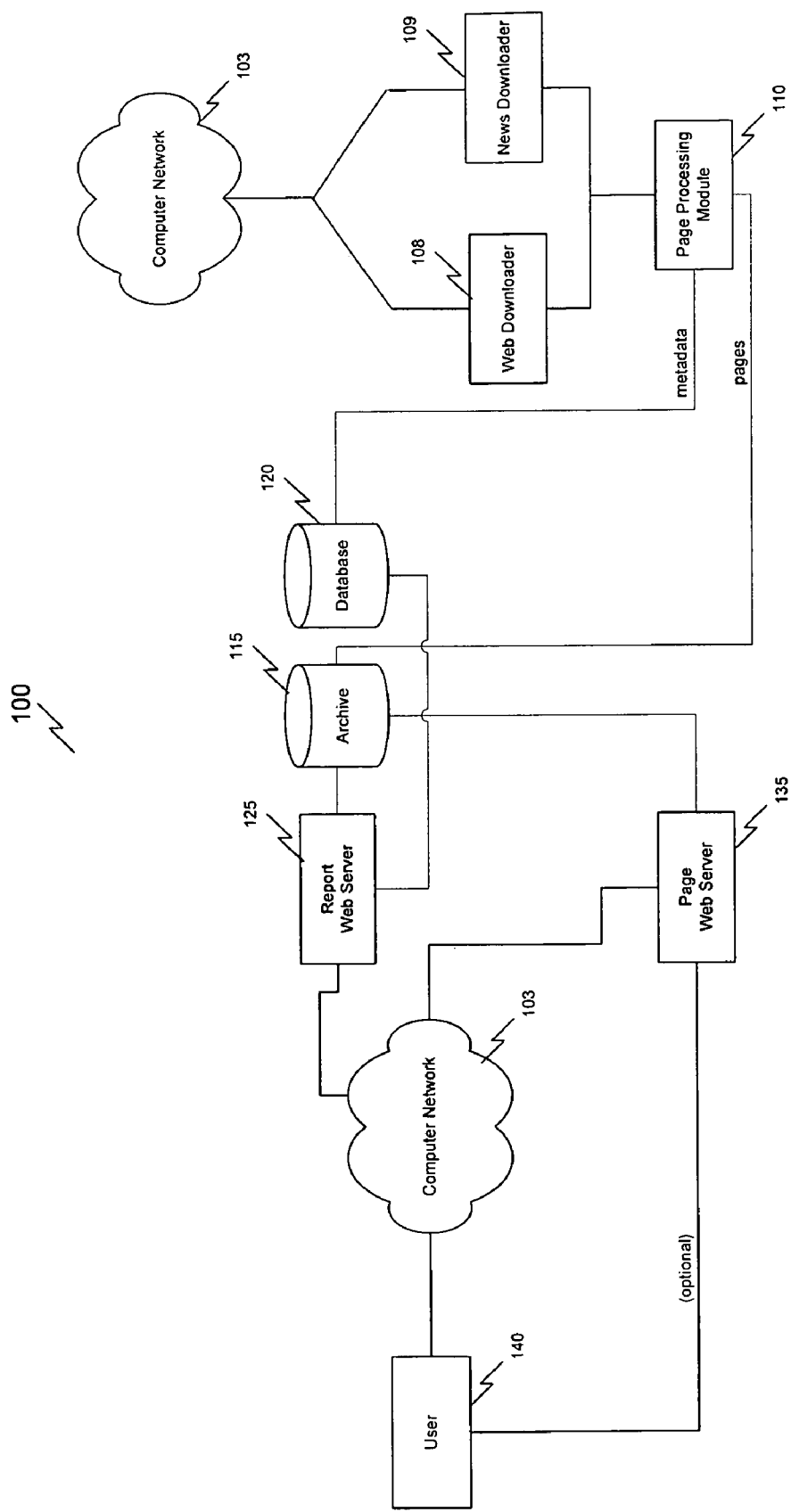
FIG. 1A is a block diagram illustrating the system architecture of an embodiment of the invention, showing network connectivity among the various components.

Referring to FIG. 1A, a block diagram illustrating the physical architecture of a e-commerce competition system 100, according to an embodiment of the invention, showing the network connectivity among the various components is shown. It should be understood that the particular e-commerce competition system 100 in FIG. 1A is shown for illustrative purposes only and does not limit the invention. As will be apparent to one skilled in the relevant art(s) based at least on the teachings described herein, all of components "inside" (not shown) of the e-commerce competition system 100 are connected directly or via computer network 103.

The e-commerce competition system 100 includes a Web downloader 108 and news downloader 109. These downloaders are configured according to the nature of the pages that they search. The system includes a page processing module 110 that serves as the "back-end" of the invention. Page processing module 110 connects to the downloaders 108 and 109 to receive downloaded pages. Connected to the page processing module 110, is a database 120 and an archive 115. Page processing module 110 performs various counting and scoring operations on the downloaded pages and forwards the resulting metadata to database 120. Metadata includes various high order results from processing the data contained on collected pages. For example, the total number of pages containing links to a certain Web site, and/or an average of the number of external links on each Web page on a Web site. Complete copies of the pages are stored on archive 115.

Report Web server 125 provides user 140 with access to the metadata stored in database 120 and the pages stored in archive 115. Users can review the metadata and pages and alter the focus of the searches conducted by the downloaders 108 and 109. This feedback measure allows the invention to fully cover areas of the computer network 103 which contain desired information. Page Web server 135 is connected to archive 115. Page Web server 135 provides user 140 with access to the stored pages used to develop metadata, which forms the bases for conclusions arrived at by the invention by the scoring processes of the present invention.

As is well-known in the relevant art(s), a Web server is a server process running at a Web site which sends out Web pages in response to Hypertext Transfer Protocol (HTTP) requests from remote browsers. The Web servers 125 and 135 serve as "front ends" of the invention. That is, the Web servers 125 and 135 provide the graphical user interface (GUI) to users of the e-commerce competition system 100 in the form of Web pages. Such users may access Web servers 125 and 135 either directly or via a connection to computer network 103 (e.g., the Internet).

While only one database 120, archive 115, and page processing module 110, are shown in FIG. 1A, it will be apparent to one skilled in the relevant art(s) that e-commerce competition system 100 may be run in a distributed fashion over a plurality of the above-mentioned network elements connected via computer network 103. For example, both the page processing module 110 "back-end" application and the Web servers 125 and 135 "front-end" may be distributed over several computers thereby increasing the overall execution speed and/or reliability of the e-commerce competition system 100. More detailed descriptions of the e-commerce competition system 100 components, as well their functionality, are provided below.

Figure 1B:
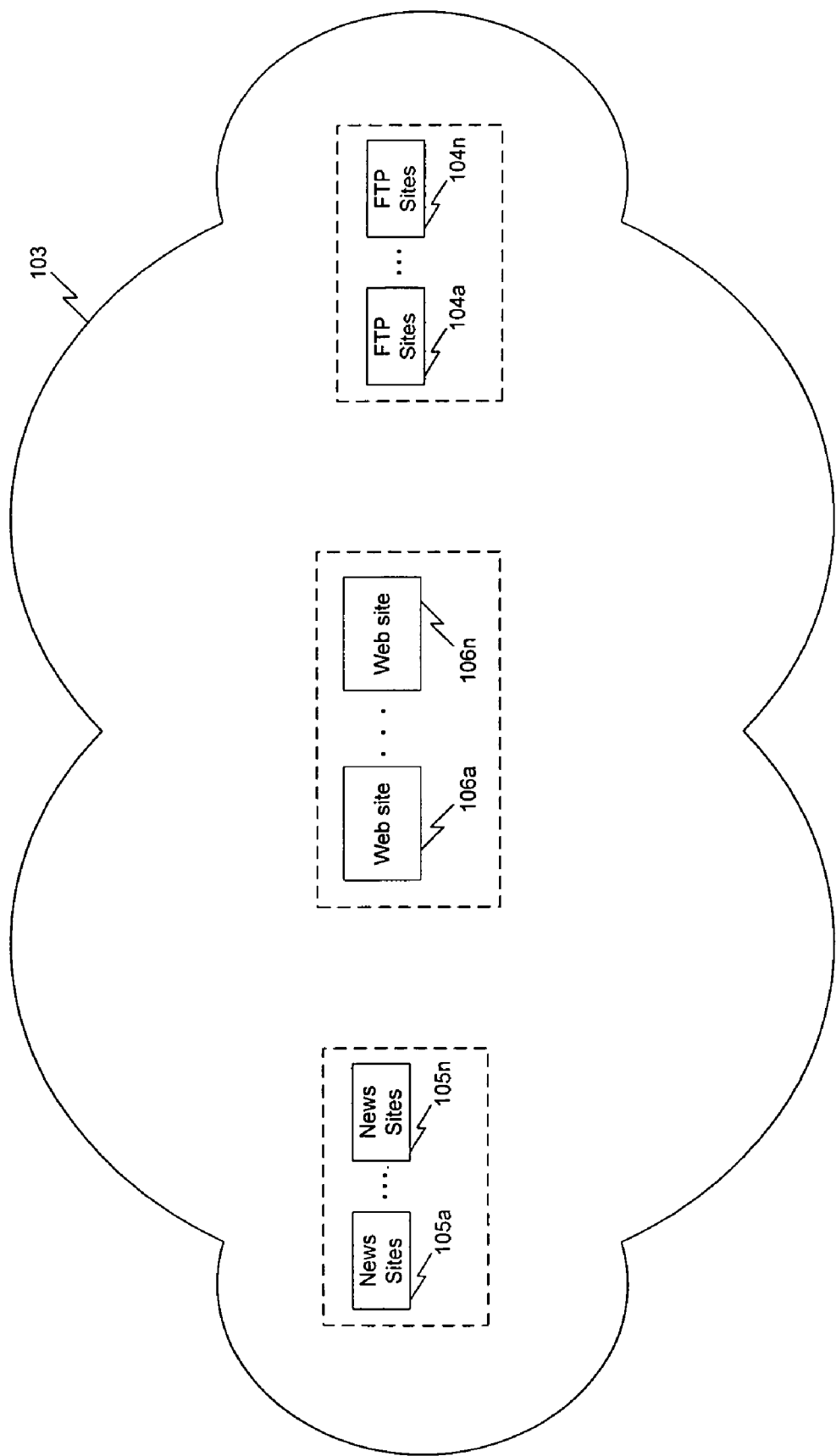
FIG. 1B is a block diagram illustrating the global Internet, showing the different components which may be present.

Referring to FIG. 1B, the global Internet depicted by computer network 103, includes a plurality of various FTP sites 104 (shown as sites 104a–n) and the WWW is shown. Within the WWW are a plurality of Web sites 106 (shown as sites 106a–n). The search space for the page processing module 110 includes the Web sites 106 and the plurality of FTP sites 104. Within the Usenet are a plurality of newsgroups 105. As mentioned above, it will be apparent to one skilled in the relevant art(s), that the search space (i.e., computer network 103) of the e-commerce competition system 100, although not shown, will also include chat rooms, mailing lists, FSP sites, etc.

As will be apparent to one skilled in the relevant art(s), audio-visual content can be parsed for analysis by using technologies such as optical character recognition (OCR) and/or watermark technologies.

III. Software Architecture

Figure 2:
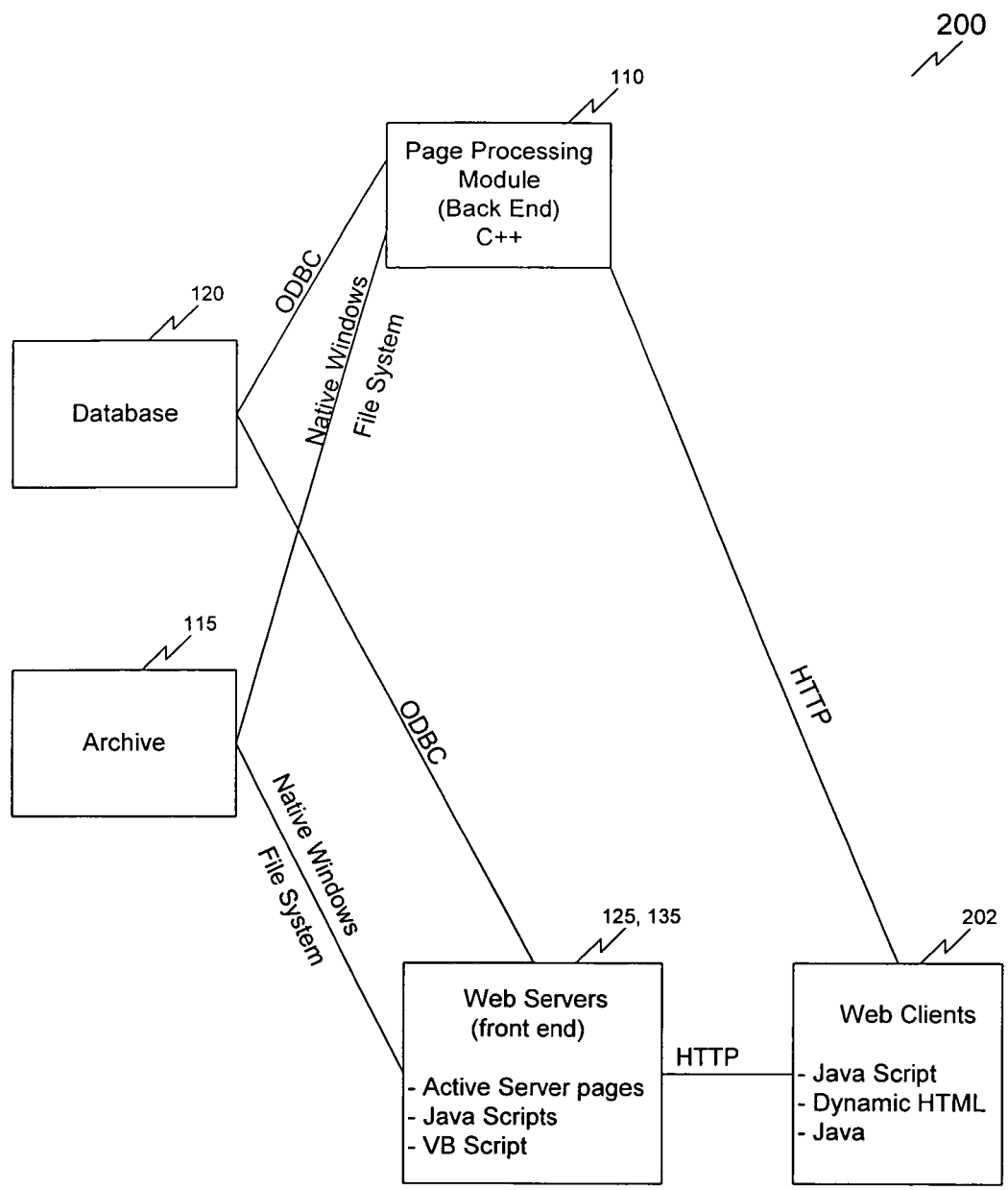
FIG. 2 is a block diagram illustrating the software architecture of an embodiment of the invention, showing communications among the various components.

Referring to FIG. 2, a block diagram illustrating a software architecture 200 according to an embodiment of e-commerce competition system 100, showing communications among the various components, is shown. The software architecture 200 of e-commerce competition system 100 includes software code that implements the page processing module 110 in a high level programming language such as the C++ programming language. Further, in an embodiment, page processing modules 110 software code is an application running on an IBM™ (or compatible) personal computer (PC) in the Windows NT™ operating system environment.

In one embodiment of the invention, the database 120 is implemented using a high-end relational database product (e.g., Microsoft™ SQL Server, IBM™ DB2, ORACLE™, INGRES™, etc.). As is well-known in the relevant art(s), relational databases allow the definition of data structures, storage and retrieval operations, and integrity constraints, where data and relations between them are organized in tables.

In one embodiment of the invention, page processing module 110 application communicates with the database 120 using the Open Database Connectivity (ODBC) interface. As is well-known in the relevant art(s), ODBC is a standard for accessing different database systems from high level programming language application. It enables these applications to submit statements to ODBC using an ODBC structured query language (SQL) and then translates these to the particular SQL commands the underlying database product employs.

The archive 115, in one embodiment of the invention, is any physical memory device that includes a storage media and a cache (e.g., the hard drive and primary cache, respectively, of the same PC that runs the page processing module 110 application). In an alternative embodiment, the archive 115 may be a memory device external to the PC hosting page processing module 110 application. In yet another alternative embodiment, the archive 115 may encompass a storage media physically separate from the cache, where the storage media may also be distributed over several elements within connected to the computer network. Further, in one embodiment of the invention, the archive 115 communicates with page processing module 110 application and Web servers 125, and 135 using the operating system's native file commands (e.g., Windows NT™).

The Web servers 125, and 135 provide the GUI "frontend" for e-commerce competition system 100. In one embodiment of the invention, it is implemented using the Active Server Pages (ASP), Visual BASIC (VB) script, Extensible Mark-up Language (XML), and JavaScript™ sever-side scripting environments that allow the creation of dynamic Web pages. The Web servers 125 and 135 communicate with any number of users 140 using HTTP. Users 140 employ a browser (or other GUI) using Java, JavaScript™, and Dynamic Hypertext Markup Language (DHTML). In one embodiment, users can connect to e-commerce metrics system 100 via a WAP phone or facsimile machine. In an embodiment of the invention, as will be described in detail below in Section VIII, users 140 may also communicate directly with page processing module 110 application via HTTP.

IV. E-commerce Competition System

Figure 3:
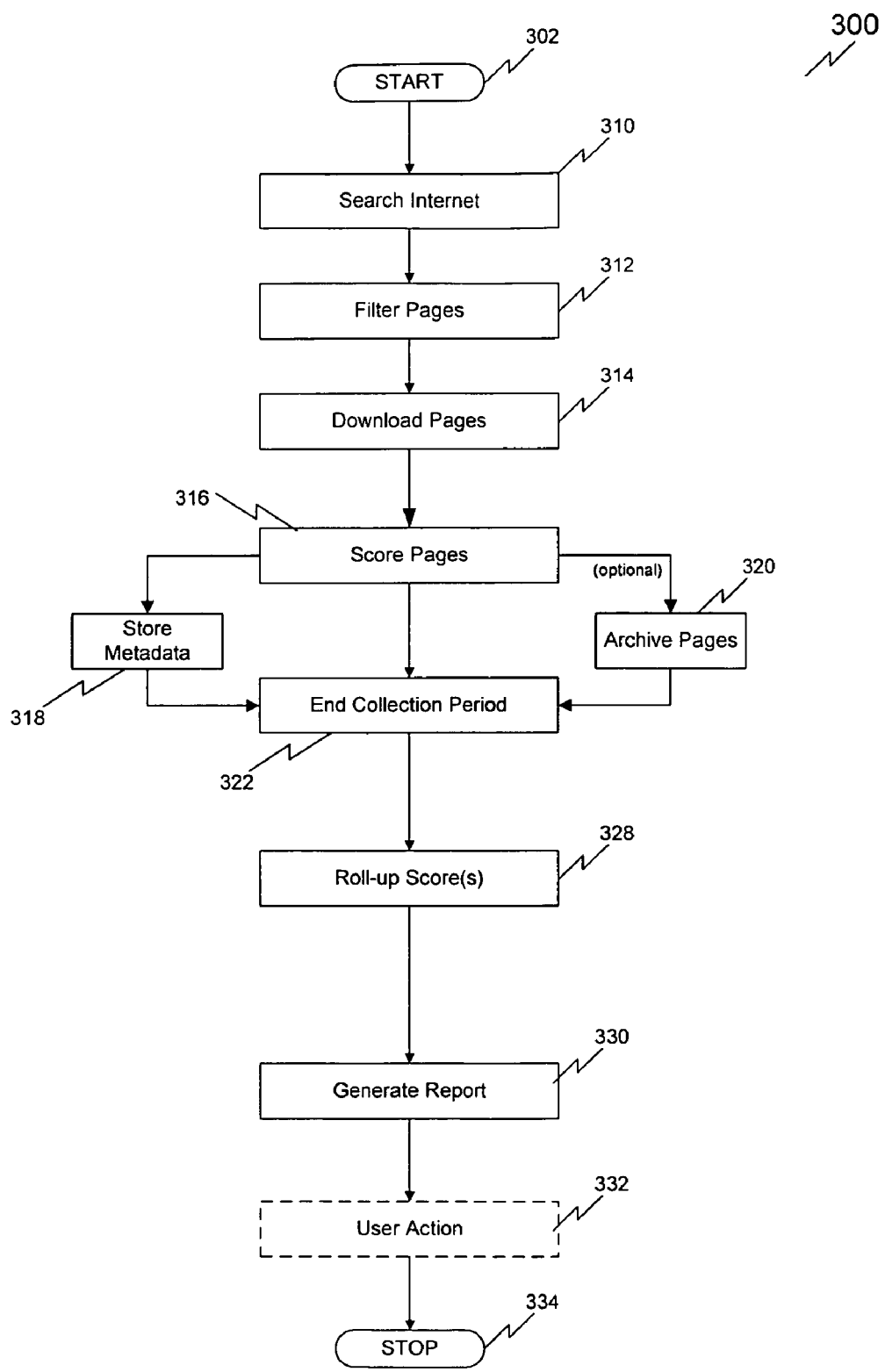
FIG. 3 is a flowchart showing the overall operation of an embodiment of the invention.

Referring to FIG. 3, a flowchart 300 showing the overall operation of the e-commerce competition system 100, according to an embodiment of the invention, is shown. Flowchart 300 begins at step 302 with control passing immediately to step 310.

From step 302 control also immediately passes to step 310. This search returns a list of probable uniform resource locators (URLs). As is well-known in the relevant art(s), a URL is the standard for specifying the location of an object on the computer network 103. The URL standard addressing scheme is specified as "protocol://hostname" (e.g., "http://www.a_company.com", "ftp://organization/pub/files" or "news:alt.topic"). An URL beginning with "http" specifies a Web site 106, an URL beginning with "ftp" specifies an FTP site 104, and an URL beginning with "nntp" specifies a newsgroup. The probable URLs indicate a first (preliminary) set of locations (i.e., addresses) on the computer network 103, based on the search criteria, where pages containing information important to entity's operations may be found. Downloaders 108 and 109 simply download everything available on computer network 103. In step 312, the retrieved pages are filtered for information that is minimally relevant for users 202. Minimally relevant pages are downloaded to page processing module 110 in step 314.

In step 314, each of the URLs is visited and the contents downloaded locally to page processing module 110. The aim of the download step 314 is so that subsequent processing steps of the e-commerce competition system 100 may be performed on preserved copies of the visited URLs. This eliminates the need for re-visiting (and thus, re-establishing a connection to) each of the URLs of Web sites 106, FTP sites 104, etc. specified by the URLs, thus increasing the overall performance of the e-commerce competition system 100.

If any of the URLs within the preliminary set contains files, those files may contain potentially relevant material (e.g., a "*.mp3" music file, or a "*.gif" or "*.jpg" image file). This is in contrast to actual text located on a Web page of a particular Web site 106. The files may be located: (1) on a different Web site 106 accessible via a hyperlink on the Web page the e-commerce competition system 100 is currently accessing; (2) on a different Web page of the same Web site 106 the e-commerce competition system 100 is currently accessing; or (3) in a different directory of the FTP site 104 than the e-commerce competition system 100 is currently accessing. In these instances, the e-commerce competition system 100 employs a Web crawling technique in order to locate the files.

The Web crawling technique of the present invention discussed herein includes the use of URL address variations. After the original URL is visited and the link to the file is identified, the e-commerce competition system 100 truncates the link URL at the rightmost slash ("/"), thus generating a new link URL. This process is repeated until a reachable domain is generated. This technique takes advantage of the fact that most designers of Web sites 106 allow "default" documents to be returned by their Web servers in response to such URL (via HTTP) requests. An example of the downloaders 108 and 109 Web crawling technique is shown in Table 1 below.

TABLE 1

EXAMPLE OF WEB CRAWLING TECHNIQUE

Original Web Page URL:

http://www.links-to-interesting-files-all-over-the-net.com
Interesting Links Found on the Original Web Page Identified by Client's Search Criteria:

http://www.really-good-music-not-yet-released.com/future-hit.mp3
ftp://www.company-trades-secrets.com/july/tradeseceret.doc
Truncated URLs:

http://www.really-good-music-not-yet-released.com/
ftp://www.company-trades-secrets.com/july/
ftp://www.company-trades-secrets.com/

For any Web site 106 where the site's server is not currently responding (i.e., "down" or "off-line"), the downloaders 108 and 109 applications, before removing the URL corresponding to the site from the preliminary set, implement a "re-try" timer and mechanism.

When any of the URLs within the preliminary set is an FTP site 104 (or FSP site), the normal steps of visiting and downloading the sites are not practical and thus, not used. Therefore, the invention contemplates a method for "FTP crawling" in order to accomplish steps 310 and 314 for such URLs.

First, the downloaders 108 and 109 applications attempt to log into the FTP site 104 specified by the URL. As is well known in the relevant art(s), there are two types of FTP sites 104—password protected sites and anonymous sites. If the site 104 is password protected and the password is not published in a reference linked page, it is passed over and the URL is removed from the preliminary set. If the FTP site 104 has a published password, the applications attempt to login using that password. If the FTP site 104 is an anonymous site, the applications attempt to log in. As is well known in the relevant art(s), an anonymous FTP site allows a user to login using a user name such as "ftp" or "anonymous" and then use their electronic mail address as the password.

If a connection can be established, the applications have access to the directory hierarchy containing the publically accessible files (e.g., a "pub" subdirectory). The applications may then "nicely" crawl the relevant portions of the FTP site 104 by mapping the directory structure and then visiting certain directories based on keywords derived from the defined search criteria (step 310).

The purpose of nice FTP crawling is to capture the relevant contents of the FTP site 104 as it relates to the entity without burdening the host's resources by crawling the entire FTP site 104. This is especially important due the large size of a typical FTP site 104 (e.g., a university's site or someone entire PC hard disk drive), and due to the lack of crawl restriction standards like the "robots.txt" file commonly found on Web sites 106.

Consider the example where the downloaders 108 and 109 are searching the for the directory: "ftp://ftp.stuff.com/~user/music/famous_artist" in the context of a search for information related to an entity's music product. First, the nice FTP crawling technique involves establishing a single connection to the FTP site 104 (even if multiple content is needed from the site) and then going to the root directory. Second, a counter is then marked zero and a directory listing and snapshot of the current directory is taken. For each directory, if the directory name is "interesting," then the downloaders 108 and 109 enter the directory, set the counter to a positive number (e.g., C=2), then repeat the listing and snapshot step. If the counter is greater than zero or the directory is on the way to the destination directory, then the directory is entered and then the listing and snapshot step is repeated.

To simulate human behavior, it is best if the downloaders 108 and 109 perform a depth first search, and introduce slight pauses between directory listings. "Interesting" directory listings are those containing terms related to the search criteria. For example, keywords for this search may include "songs," "sound,". "album," "artist," "mp3," music_type, famous_artist, etc., and the destination directory (in the example, it can be "/famous_artist"), and other hard-coded directories that are usually of interest (e.g., "/incoming").

In an alternative embodiment, user 140 could also specify that uninteresting directories be crawled as well. The purpose of the counter (C) is to set the amount (depth) of sub-directories that the downloaders 108 and 109 will crawl in order to find "interesting" files. In one embodiment of the invention, to ease the burden on FTP site 104 servers, the total number of directories that can be crawled in a single FTP session may be limited.

An example of the nice FTP crawling technique of the downloaders 108 and 109 are presented in Table 2 below. Table 2 illustrates a depth-first (from top to bottom) traversal of the directory structure of an FTP site 104 and 002 as well.

TABLE 2

EXAMPLE OF NICE FTP CRAWLING TECHNIQUE ftp://ftp.stuff.com/
    ftp://ftp.stuff.com/~user
        ftp://ftp.stuff.com/~user/homework
        C ftp://ftp.stuff.com/~user/music
            C- ftp://ftp.stuff.com/~user/music/famous_artist1
            ...
            *C- ftp://ftp.stuff.com/~user/music/famous_artist
            ...
            C- ftp://ftp.stuff.com/~user/music/famous_artist2
            ...
            C- ftp://ftp.stuff.com/~user/music/famous_artist3
        ...
        ftp://ftp.stuff.com/~user/poetry
    ftp://ftp.stuff.com/~user2

TABLE 2-continued

EXAMPLE OF NICE FTP CRAWLING TECHNIQUE ftp://ftp.stuff.com/~user3
    C ftp://ftp.stuff.com/incoming
    ...

C = directory judged to be "interesting" in context of the search and counter set to C
C- = counter decremented at this level of the directory tree
* = destination directory
... = the page processing module 110 crawls every subdirectory up to the depth of C under the directory The above-described "nice FTP crawling" allows users 140 to obtain reports with both the URL and contents of any interesting FTP site 104.

For any FTP site 104 where the password failed, it is passed over and the URL is removed from the preliminary set. If the site's server is not currently responding (i.e., "down" or "off-line"), too many users were already logged in, or otherwise unavailable for connection, the downloaders 108 and 109 applications, before removing the URL corresponding to those sites from the preliminary set, implement a "re-try" timer and mechanism.

In step 316, the locally downloaded pages are scored (i.e., ranked). The scoring of the individual pages is based on the inputs specified in the search criteria (step 304). Each page is given a score based on a text search of keywords from the search criteria and statistics accumulated from analyzing the pages. The application of page processing module 110 possesses inference code logic that allows anything resident on a page or in the underlying HTML code (i.e., tags) that formats the page to be numerically weighted. The scoring may be based on the separate regions of the page such as the title or information within a tag (e.g., meta-tags, anchor tags, etc.). Also, scoring may be based on such information as the URL of the page itself, dimensions of pictures on the page, the presence of a specific picture file, the number of a certain type of file, length of sound files, watermarks, embedded source information, as well as information about a page provided by another page. During this process, the e-commerce competition system 100 possesses logic to also recognize exact duplicates of client's graphics files (i.e., pictures, logos, etc.), without the need for digital water marking. This additional logic further contributes to the scoring process of step 316. The numbers, figures, and statistics generated by the scoring process is collectively referred to as metadata. Metadata is stored in database 120 in step 318.

The scoring of pages may also involve whether any offending URLs contain advertising. This is useful information to clients because those sites are considered commercial and not fan or personal (i.e., non-commercial) sites. Advertisement recognition is accomplished by parsing an image located within an URL and capturing the alt text (alt text is an HTML attribute that displays a block of text as an alternative to an image, for text-based browsers. It is used inside the <IMG> tag; the format is <IMG SRC="URL" ALT="TEXT"), click-through URL, click-through resolved URL, and URL of the image. Then, if any of the following three rules are met, the e-commerce competition system 100 identifies the probable presence of an advertisement: (1) the alt text or URL of the advertisement image contains keywords common to those around known advertisements; (2) the click-through URL and the resolved click through URL specify different domains; or (3) the image is an exact match of a known advertisement.

During this process, the e-commerce competition system 100 develops a table of advertisement dimensions that are common to each Web site 106 encountered. Thus, in an alternative embodiment, a fourth rule is used to recognize advertisements. That is, if the dimensions of the image fit the tolerances of the dimensions in the table for a Web site 106, the image is probably an advertisement. The data for the table of advertisement dimensions are kept in archive 115 and queried via the database 120. Accordingly, the score for each page is adjusted (i.e., increased) if the system 100 identifies the presence of a probable advertisement.

In step 320, a archive of the pages is done to the storage media of archive 115. In order to archive each Web page, the "inline" contents of the page must be separated from the non-inline contents. Inline contents include any text, sounds, and images found directly on the Web page and that automatically plays or is displayed when the page is browsed. In contrast, non-inline contents include the links that Web pages contain to other Web sites 106. In order to obtain a "self-sustaining" local copy of the Web page, only the inline contents of each Web page of the preliminary list of URLs is stored in archive 115. In an alternative embodiment, a client may want included in their final report (step 330 described below) properties or metrics associated with non-inline contents of relevant pages. Thus, in such an embodiment, step 320 can also include the non-inline contents of each Web page (i.e., a "complete" archive). In another embodiment, the system 100 in step 320 could generate a snapshot of the page and store this snapshot as a single graphical image.

As indicated in FIG. 3, step 320 is optional. That is, a user may desire not to perform a complete archive (and thus, not create self-sustaining local copies of the Web pages. Thus, the operation of e-commerce competition system 100 may proceed directly to step 322 after the pages are scored in step 316. In an alternative embodiment, step 320 may perform a summary archive where, for example, only the headers and/or titles of the pages is archived.

In step 320, the preliminary set of URLs is grouped into "actual sites." Most people equate Web sites 106 with either domain names or host names. For example, a URL of "http://www.a_company.com" and all the pages under it are typically viewed as one Web site 106. However, as Web designers develop schemes to partition their sites among distinct users, they divide their name space to create sub-sites. Examples are "community sites" which are companies or organizations that provide free homepages to individual consumers, and university servers that host student homepages. In these examples, each user or student with a homepage is an "actual site." For example, the page processing module 110 application may obtain a preliminary list of probable URLs containing the URLs shown in Table 3 below.

TABLE 3

PRELIMINARY LIST OF URLs http://www.university_with_many_students.edu/students/b/joe_smith/main.html
http://www.university_with_many_students.edu/students/b/joe_smith/pics/me.jpg
http://www.university_with_many_students.edu/students/c/jane_hacker/main.html
.
.
.

In the example of Table 3, the first two URLs are one actual site, whereas the third is a separate actual site. In one embodiment of the invention, the page processing module 110 application may recognize which URLs to group into one actual site based both on: (1) patterns such as ~username, /students/?/<?>, /users/?/<?>, /homepages/?/<?>—where "?" is a single character wildcard and "<?>" is an optional single character wildcard; and (2) hard-coded rules for known sites which follow no discernable patterns (e.g., the GeoCities™ community site). The grouping step aids in arriving at a manageable but informative number of URLs that will be included in a user's final report. In one embodiment of the invention, the above-described grouping technique may be used, in conjunction with the score pages step 316, to present the user with the "best" (i.e., highest scoring) page within an actual site. This removes information clutter from the final report and further aids in arriving at a manageable number of URLs to report.

In step 322, the e-commerce competition system 100 groups waits for the page collection period to end. In one embodiment, regularly scheduled collection periods are determined. In another embodiment, the collection period ends according to user 140 specified dates. In yet another embodiment, the collection period ends when page processing module 110 determines that no new pages are available.

It should be noted that in alternative embodiments of the invention, the score pages step 316, archive step 320, wait and collection step 322, and roll-up step 328 may be performed in an order different than that presented herein without departing from the spirit and scope of the invention.

In step 328, the e-commerce competition system 100 performs a roll-up score that aggregates the entity scores for a preselected group of peers against which an entity is compared. This group of peers would include competitors that the entity may or may not be aware of and thus, would like to (or should be) be measured against.

In step 330, a report is generated for the user. The report may be customized for a particular entity and typically includes the refined list of URLs, the contact information for each URL, the score for each URL, metadata provided by page processing module 110, as well as various benchmarks. Database 120 is utilized to query the archived metadata in generating reports, using the tables. Reports may relay information, for example, on how downloaded pages have changed over time. A more detailed description of output reports and examples are presented in Section VII below.

In step 332, the user, using the report, may then take action in accordance with the information presented in the report. In one embodiment of the invention, the information contained in the output report may be used by the e-commerce competition system 100 to be directly inputted into an entity's business model. For example, the output report may be used to automatically generate: (1) Cease and desist letters (customized for each entity) to each offending Web site 106 operator; (2) Reminder letters to channel partners and affiliates about proper pricing, privacy, warranty and refund policies; and/or (3) Marketing trend graphs estimating the traffic levels of Web sites 106. Additional output reports can be implemented. One skilled in the relevant art(s) based at least on the teachings described herein can recognize the applicability of the information and metadata to specific entity e-commerce concerns. Flowchart 300 (i.e., the operation of e-commerce competition system 100) is thus complete as indicated by step 334.

As mentioned above, in one embodiment of the invention, the page processing module 110, and downloaders 108 and 109 are high-level programming language (e.g., C++) applications written for the Microsoft Windows™ environment. In one embodiment, the applications are multi-threaded. That is, the program execution environment interleaves instructions from multiple independent execution "threads." The multi-threaded applications thus allow multiple instances of each component (thread) to run simultaneously, on the same computer or in a distributed fashion, thereby increasing the throughput of the e-commerce competition system 100 (i.e., allows searching for multiple entities to be done simultaneously).

As mentioned above, the search may be performed in one of two modes to aid in arriving at a manageable number of URLs to be included in a user's final report. The two modes are "meta search engine" mode and "standard search" mode.

Once a "meta search engine" mode search has been performed, a "standard search" where a list of individual sites is searched may be performed. Alternatively, the "standard search" may search a list provided from a client as known offending sites. Each site is visited and made available to the archive 115 (to perform step 320 as indicated in FIG. 3).

The media search engine mode, according to an embodiment of the invention, begins with control passing immediately to page processing module 110. Page processing module 110 receives from the front-end a list of selected search engines to be searched. As is well-known in the relevant art(s), many commercial and non-commercial search engines are available on the Internet that allow remote access to perform keyword searches for information (e.g., full text, document titles, URLs, headers, etc.). Examples of such commercially available search engines include the HotBot™, Excite™, and InfoSeek™ search engines.

The defined search criteria received by the front end are translated into keywords in order to perform an appropriate search of the selected search engines. In the case of page processing module 110, the application forwards the search criteria to downloaders 108 and 109. The downloaders 108 and 109 applications must first sub-divide a large query into a set of sub-queries sufficiently small for existing search engines to perform, based on the maximum number of URL matches (or "hits") which they return. Thus, in order to perform a full search and ensure the preliminary list of probable URLs that is sufficiently large, an optimizing series of searching steps is performed by implementing a boolean search tree.

A main topic keyword is identified from the translated search criteria derived. A set of related topic keywords is identified from the translated search criteria derived. The search engine is queried for the main topic keyword. It is determined whether the number of hits is below the maximum limit. If the number of hits is below the maximum limit, the list of returned URLs (hits) is collected.

If the number of hits is not below the maximum limit, it is determined whether there are any unused (i.e., not queried) keywords from the set of related topic keywords. If there are any unused set of related topic keywords, the applications of downloaders 108 and 109 construct two new search queries: (1) {topic} AND {next unused related keyword}; and (2) {topic} AND NOT {next unused related keyword}. Then, the two new query terms are searched. This process is recursively repeated until all number of hits are below the limit or no more unused related keyword remain. All the lists of returned URLs (hits) from each query are then collected.

An example of the above-described optimizing series of searching (i.e., a boolean search tree) is shown in Table 4 below. As will be apparent to one skilled in the relevant art(s), the searching can be repeated for every search engine selected in step 310.

TABLE 4

EXAMPLE OF OPTIMIZING SERIES OF SEARCHING STEPS

Search Engine Limit = 1000 hits
Topic = car
Related Words = {sports, red, new, Brand ™, truck}
Queries =
    Car {5000 hits}
        Car AND sports {3500 hits}
            (Car AND sports) AND new {800 hits}
            (Car AND sports) AND NOT new {2700 hits}
                ((Car AND sports) AND NOT new) AND Brand {900 hits}*
                ((Car AND sports) AND NOT new) AND NOT Brand
                                        {1600 hits}
                (((Car AND sports) AND NOT new) AND NOT Brand)
                                        {700 hits}*
                (((Car AND sports) AND NOT new) AND NOT Brand)
                                        {900 hits}*
        Car AND NOT sports {1500 hits}
            (Car AND NOT sports) AND new {900 hits}*
            (Car AND NOT sports) AND NOT new {600 hits}*

*The results of these queries may be downloaded and combined into an (unordered) list of probable URLs.

As mentioned above, the e-commerce competition system 100 may also monitor addresses and search for contents, within the computer network 103, from sites other than Web sites 106 and FTP sites 104.

If, as part of the searching step 310, a URL that specifies an entire newsgroup is encountered, the page processing module 110 application can direct news downloader 109 to connect to a newsgroup server using the network news transfer protocol (NNTP), and download all news postings in the specified newsgroup that have not been previously downloaded (determined through message ID numbers). Each news posting is considered an individual piece of content or page. Associated data such as the headers are also kept, as they provide extra data the help discern the content and intent of the page. In an embodiment of the invention, news downloader 109 may be put in a "continuous monitor" mode to continually monitor a newsgroup. Thus, the news downloader 109 application can re-execute the above-described process at an interval shorter than the time a news server times-out.

If as part of the downloading step 314, an URL that specifies a real-time content site, such as a chat room, or live real audio stream is encountered, the downloaders 108 and 109 can watch a stream of data coming from the desired source. As is well-known in the relevant art(s), chat streams typically use the Internet relay chat (IRC) protocol, while real audio streams typically use the Portable Anymap (PNM) protocol. The applications can then save the stream in a form that can later be used for playback (i.e., a "self-sustaining" copy). Because the stream has the potential to play forever, it is desired to divide the stream into chunks that may be re-assembled at a later time. Thus, monitoring continues until either the stream stops, the capture time specified by the user has expired, or if a live filter is being used, the data is shown to be "uninteresting." It is important for downloaders 108 and 109 to be controlled by a page processing module 110 in order to capture such real-time streams as they are transient and can otherwise be missed.

In the embodiments discussed above, for a statistical sampling to accurately represent the state of information on the Internet, random search methods are the only ones employed. In alternate embodiments, with more definite search parameters applications, directed searches can be employed.

V. Graphical User Interface (Front-End)

As mentioned above, in one embodiment of the invention, the report Web server 125 front-end provides dynamic HTML pages as the input (GUI) screens to the users 140. The software architecture 200 (as shown in FIG. 2) allows users to view and manipulate the database 102 and the archive 115 without needing to communicate with page processing module 110.

The step of defining the search criteria may be customized for each entity and their monitoring needs. The e-commerce competition system 100, and more particularly the operation of the page processing module 110 application search engine, is sufficiently flexible in order to assure that standard or customized input screens can be used in routine 300.

The customized input HTML GUI screens of the invention will be dictated by the particular client's needs. For example, users will focus their e-commerce efforts in different areas. The criteria for prioritization may include such factors as whether advertisements appear on the Web site 106, the magnitude of competing activity, misuse of an entity's intellectual property, etc. Thus, preferably before commencing a search, search criteria are defined that includes a main topic, fields, prioritizations, and de-prioritizations.

Given the vast amount of information on the Internet, it is important to define the main topic that is to be searched. While the e-commerce competition system 100 has the ability to search extremely broad topics, the narrower the topic, the more efficient the search. Search topics may include any combination of company names, company subsidiaries, company assets (e.g., a particular artist on a particular record label), etc. In order to maximize the probability of including all relevant information into a search, it is also important to define all possible permutations of a topic. For example, in order to retrieve all of the pages pertaining to a specific company, the e-commerce competition system 100 can need to search the company name, nicknames, its acronym, its products and/or its services.

Prior to commencing the actual search step 310, it is preferable to define exactly what fields of information need to be searched. Examples of relevant information fields include the topics: origin, perception, usage, links, etc. and the categories: personal, education, commercial, foundation, etc. (i.e., categories for origin). In one embodiment, where an entity wishes to take advantage of the e-commerce metrics system 100 capabilities does not understand what topics or categories to search, another user can define initial topics and categories, based on prior experience and knowledge, and then the entity to modify these initial definitions based on the entity's knowledge of their business and industry.

Finally, it is important to prioritize and de-prioritize pages based on an entity's needs. The users 140 may work to build a prioritization list, and assign numeric weights to the items on the list. These items are those described above with reference to FIG. 3 (i.e., scoring contents step 316) and below with reference to FIG. 5.

As will be apparent to one skilled in the relevant art(s), the GUI of the front-end 125 will allow users 140 of e-commerce competition system 100 to specify all inputs (e.g., search criteria, FTP depth counter(s), list of specific URLs to search, the total number of sub-directories to crawl, etc.) and mode options (e.g., full, partial, or no archive, etc.) described herein.

VI. Page Processing Module (Back-End)

Figure 4:
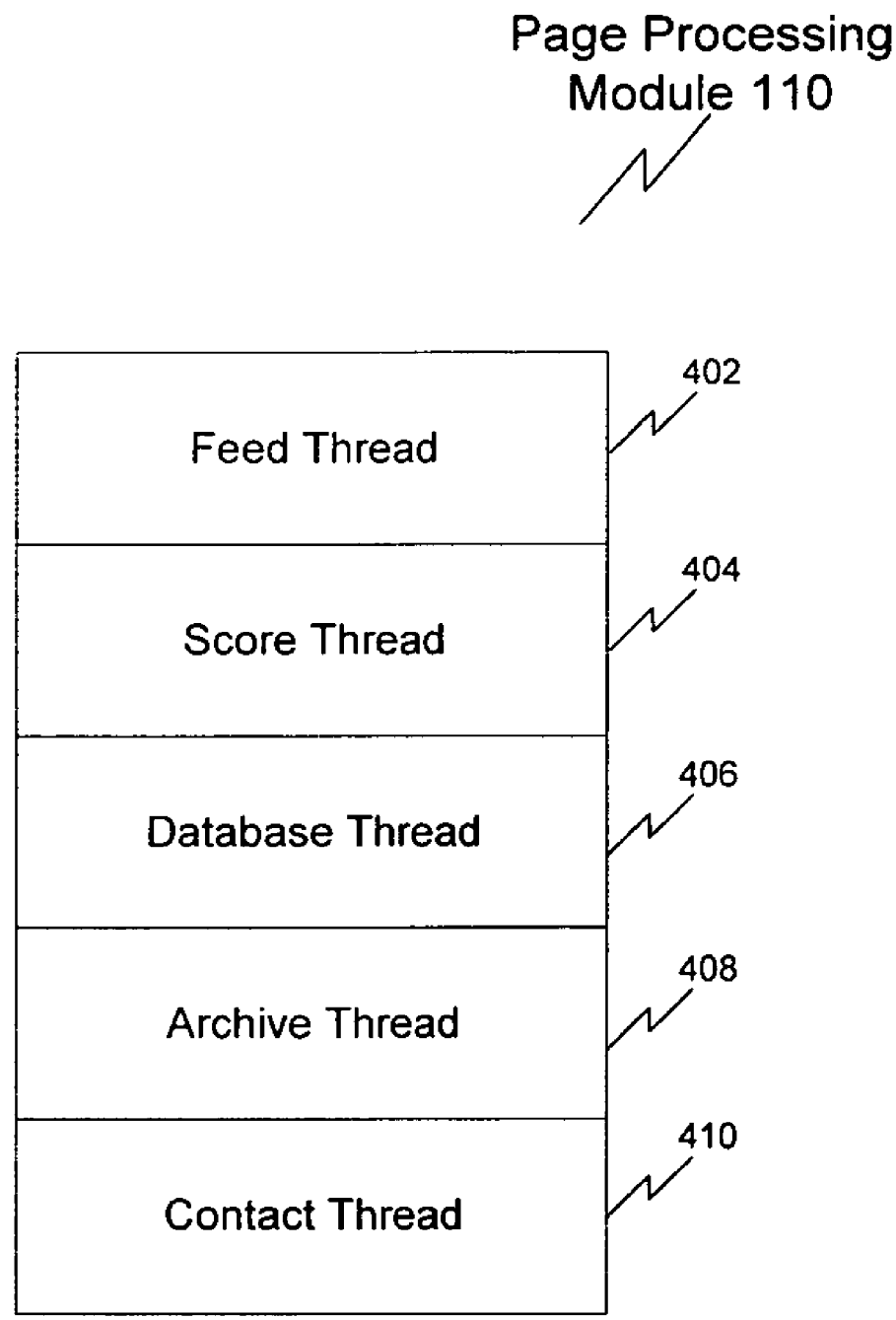
FIG. 4 is a block diagram illustrating the software architecture of a page processing module according to an embodiment of the invention.

As mentioned above, in one embodiment of the invention, page processing module 110 back-end is a high-level programming language (e.g., C++) application written for the Microsoft Windows™ environment. Referring to FIG. 4, a block diagram illustrating the software architecture of the page processing module 110 application is shown. In one embodiment, the page processing module 110 application is multi-threaded. That is, the program execution environment interleaves instructions from multiple independent execution "threads." The multi-threaded page processing module 110 application thus allows multiple instances of each component (thread) to run simultaneously, on the same computer or in a distributed fashion, thereby increasing the throughput of the e-commerce competition system 100 (i.e., allows processing for multiple entities to be done simultaneously). The threads of the page processing module 110 application include a feed thread 402, an score thread 404, a database thread 406, an archive thread 408, and a contact thread 410.

The feed thread 402 performs steps 504 to 508 as described below with reference to FIG. 5. That is, the feed thread 402 is responsible for receiving pages from downloaders 108 and 109 within page processing module 110 (step 504). The feed thread 402 also temporarily stores the pages (step 506) before feeding them (step 508) into the scoring steps 512–518.

The score thread 404 performs steps 512–518 as described below with reference to FIG. 5. That is, the score thread 404 is responsible for scoring and grouping the Web pages of the URLs previously downloaded by the feed thread 402. The scoring thread 404 possesses code logic to recognize and extract metadata from each page in order to later generate an entity's report. Such metadata includes descriptions, titles, electronic mail addresses, etc. The scoring of each URL done by the scoring thread 404 is based on the presence, location, and the number of occurrences of certain keywords, links, HTML tags, etc. Furthermore, in addition to scoring the URLs, the "best" (i.e., highest scoring) page from each actual site is marked.

The database thread 406 performs step 318 as described above with reference to FIG. 3. That is, the database thread is responsible for storing associated information about the Web page other than its content. Such information (file size, dimensions, hash value, date archived, file type, width, height, etc.) assures that only modified Web pages, which may have been previously downloaded, are re-downloaded. This also ensures that duplicate and mirror pages are not downloaded and removed from the list of probable URLs. Furthermore, the database thread 406 possesses intelligence to check return values and error messages when visiting each Web page for downloading. If any URL is unavailable (e.g., non-valid or inactive), before it is passed over and removed from the list of probable URLs, a "re-try" timer and mechanism is utilized.

The archive thread 408 performs step 320 described above reference to FIG. 3 That is, the archive thread 408 is responsible for fully archiving the URLs downloaded by the score thread 404 to the storage media of archive 115. The archive thread 408 archives the inline contents of each Web page of each URLs to the archive 115. This assures that e-commerce competition system 100 has a "self-sustaining" local copy of the Web page for later analysis. That is, archived pages will use the archived copy of its links when later browsed within e-commerce competition system 100. The archive thread 408 also possesses code logic to time-stamp the pages and thus, create a "paper trail" that documents the evolution of an offending Web site. This paper trail may also later serve as evidence for a client's legal (enforcement) activities. The archive thread allows the relational database 102 to have access to the archived data when asked to perform queries during the reporting step 330.

The contact thread 410 performs within step 510 as described below with reference to FIG. 5. That is, the contact thread is responsible for the automated task of obtaining the InterNIC contact information for each URL in the refined list obtained from the database thread 406 and stored by the archive thread 408.

Figure 5:
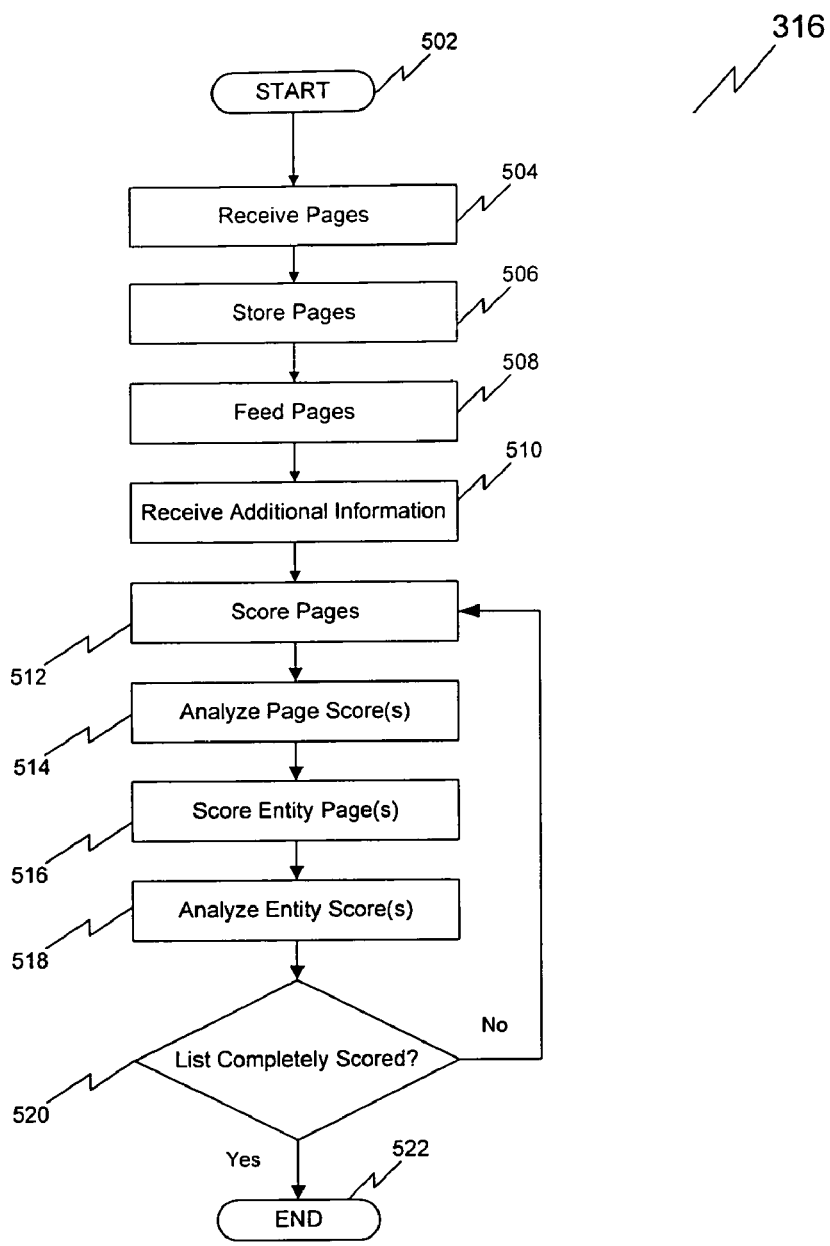
FIG. 5 is a flowchart showing the operation of scoring pages, according to an embodiment of the invention.

Referring to FIG. 5, a flowchart showing the scoring operations of page processing module 110 applications (during step 316), according to an embodiment of the invention, is shown. Flowchart 316 begins at step 502 with control passing immediately to step 504. In step 504, page processing module 1110 receives pages to be scored.

In step 506, the received pages are temporarily stored so that they may be steadily fed into the scoring processes without possible delays from step 504. In step 508, pages are fed into the scoring process (step 512) along with additional information (step 510) from contact thread 410 and existing metadata in database 120. Scoring step 512 processes the information found on the page in order to determine the content and intent of the page. The score results are eventually stored as metadata.

In step 514, the scores from pages is analyzed for higher order information purposes, such as Web site patterns and ownership. For instance, pages can be counted for various browser magnets. Browser magnets take various forms: domain names, links, metatags, text, titles, and URLs. By counting (summing) all of the instances of these magnets, step 514 can generate statistics that determine the location within a Web site and on a Web page or other page. For example, the statistics would determine that the location of the entity's name or brands are on pages that contain other entity's name(s) and/or brand(s). The pages are archived in archive 115 to preserve their content because the actual Web sites are subject to factors outside of the system's control (step 320). Metadata containing scoring information and determined statistics are stored in database 120 (step 318).

Once the initial scoring and analysis is complete (steps 512 and 514), entity specific pages are scored for specific information relevant to the entity (step 516). This metadata is then analyzed to determine trends, reach conclusions about the entity score(s), etc. (step 518). Once all the entities's pages are scored and the list is completed, the routine ends (step 522).

FIGS. 6, 7, 8A and 8B show input search screens of the present invention. The information in these screens is stored as metadata in database 120. Users 140 input the information to enable the system 100 to search, retrieve and score pages. These screens are exemplary and for illustrative purposes only, as the present invention is sufficiently flexible to allow different screen designs. It should be noted that the particular information appearing in input screens of the e-commerce competition system 100, result from the entity's e-commerce needs. Thus, it will be apparent to one skilled in the relevant art(s) that the search criteria defined in step 310 dictates the information that will be extracted from the pages of the URLs during operation of the e-commerce competition system 100. The search criteria also dictate the types of queries page processing module 110 will make of the relational database 120 during the generate report step 330.

Referring to FIG. 6, an input screen 602 for entering and reviewing score words is shown. This screen is used to create score words and formulae. The words and formulae are prioritized with a number value which aids in the ordering of operations performed on downloaded pages. In one example, score words are used to filter out insignificant data (step 312) and sort the remainder based on resulting score (step 316).

In one embodiment, FIGS. 6 and 7 show the score words and formulae for scoring step 516 and analyzing step 518 of score pages routine 316 (as shown in FIG. 5). Entity specific information is stored and used as the basis for the scoring process. In another embodiment, FIGS. 8A and 8B show the score words and formulae for scoring step 512 and analyzing step 514 of score pages routine 316 (as shown in FIG. 5). Global information is used to score and analyze pages into non-entity specific categories while steps 516 and 518 focus on the entity specific information that may be present on the pages.

Referring to FIG. 6, screen 602 includes a nonce 604 field is a unique value assigned to a word that will be searched. Nonce field 604 can be PC assigned and checked to avoid duplication. Similarly, a word field 606 field shows the search term (or word) and can be designed to show a listing of words. Words that make up word field 606 are also PC generated and are determined from the search criteria or information entered by users 140. Version field 610 tracks the number of times a score word has been modified, activated and/or deactivated. Comment field 610 allows users 140 to enter comments which can be displayed along with the score words to aid in the understanding of any particular score word.

Some of the elements of input screen 602 take the form of button, hot spot or link which provide additional functionality. The form of these elements is not critical to the operation of the e-commerce competition system 100 and are for illustrative purposes only. Edit link 612 is a field which when entered allows for the alteration of the score word. Attributes field 614 displays a listing of the properties of a score word. These properties are shown in the lower half of the input screen 602. These properties include: score name field 622, primary page score field 626, boost points field 628 (optional), and functional links (i.e., buttons): show debug info link 616, reset link 618, and submit link 620.

Company name field 632, brand name field 632, domain name field 634 are used to filter for entity specific pages. Search engine keyword field 636 allows for filtering of pages based on additional entity information (for example, executive names, inventor names, partner and affiliate information, etc.).

The attributes field 614 for a score word apply to the score formula shown in FIG. 7. By altering the attributes field 614 (such as, by use of value from the score field 622), the formula is altered. Score name field 622 is filled with the name of the score word. Using reset link 618 on this element will erase the particular score name field 622 selected. Primary score page field 626 provides operational ordering to the score word. By selecting various ordering options, the primary score page field 626 can provide a higher or lower priority to the score word. Boost points field 628 is an optional element which allows for the arbitrary increase or decrease in the score.

FIG. 7 shows input screen 702 for managing score formulae. Screen 702 includes nonce field 704, formula field 706, version field 708, operational_order field 710, comment field 712, and edit link 714. Edit link 714 allows for access to buttons, hot spots and/or links: add link 716, modify link 718, and delete link 720.

Score formulae can be customized for any entity, based on score words and other factors. Nonce field 704 is similar to nonce field 604 and provides a unique identifier. Formula field 706 is similar to word field 606 and contains the formula bases on either word(s) or nonce(s), or both. Version field 708 is similar to version field 608. Operational_order field 710 is a value used to identify the order in which formulae will be completed. In one embodiment, score formulae are processed based on their operational order or dependencies. For example, a formula may require the result determined by another formula. Thus, the latter formula can have to be calculated before the former. In another embodiment, where the operational order is the same or there are no dependencies, formulae can be processed simultaneously or in a random order. In some instances, a score formula contains a variable which is determined by another score formula(e). In these instances, certain score formula(e) must be completed first.

Comment field 712 is similar to comment field 610 and provide users 140 with a way to comment on a formula. Edit link 714 allows for the editing of formulae. Add link 716, modify link 718 and delete link 720 provide functional elements for affecting formula(e). Active field 722 displays the level of activity (on or off in some embodiments) of a formula. Functions field 724 provides a listing of common functions, logical statements, and/or algebraic terms. These provide any one of users 140 with expressions from which to build score formulae. E-types field 726 is a value which allows any one of users 140 to set the type of elements (such as entire pages, html, binaries, or images) included in the scoring process on a per score formula basis. Mime-types field 728 is similar to e-types field 726 and allows selection of specific mime-type values.

Top-level domain types field 730 provides a listing of specific top-level domain names to be included in a search as belonging to a specific entity. Input box field 732 allows to modification of any of the above elements when it is selected. Attributes field 734 provide similar attribute information as attributes 614 in FIG. 6.

FIG. 8A shows input screen for global word, group and formula screen 802. Screen 802 provides similar variables and functionality as the screens of FIGS. 6 and 7, but with respect to words and formulae which apply to all the pages downloaded by e-commerce competition system 100. Global score words field 804 include a set of score words with nonce field 808, version field 810 and attribute 812 field. These fields are similar to those discussed with reference to screens 602 and 702.

Additionally, global score groups field 806 are formed from sets of global score words field 804. Groups field 806 include nonce field 814, version field 816 and attributes field 818 elements similar to those discussed with reference to FIGS. 6 and 7. Global score formulae field 803 are similar to score formulae field 702 and have similar elements: nonce field 820, version field 822, operational_order field 824, comment field 826, edit link 828 and attributes field 830.

Attributes field 830 are shown in more detail in FIG. 8B, and include score word field 854, add a word link 856, nonce field 858, version field 860, comment field 862, human readable field 864, full word field 866, case sensitive field 868, regular expression (regex) field 870, regex help field 872, and regex translation field 874. Fields 854, 856, 858, 860, and 862 are similar to the fields discussed above with respect to FIGS. 6 and 7. Human readable field 864 allows any one of users 202 to enter a human readable version of a formula(e) or word(s). Full word field 866 is an optional feature that allows for the inclusion of the full score word in the scoring process. Case sensitive field 868 is similar to full word field 866 and is an optional feature for pre-determining if scoring is based on case sensitive score words. Regular expression (regex) field 870 is an optional feature which allows for the inclusion in the scoring process of words which only change in their suffixes, such as hack, hacker, hacked, hacking, hackers, etc. Regex help field 872 is an optional feature for translating regular expressions into score words. Regex translation field 874 provides an optional quick reference for reviewing regular expressions before and after translating them with regex help field 872.

VII. Output Reports

Similar to the search input screens of FIGS. 6, 7, 8A, and 8B, and the step of defining the search criteria (step 302 of FIG. 3), the output reports of the invention may be also be customized for each user 140. The e-commerce competition system 100, and more particularly the operation of page processing module 110 application threads, is sufficiently flexible in order to assure that customized reports may be generated and delivered in electronic (soft copy) or paper (hard copy) form.

Figure 9:
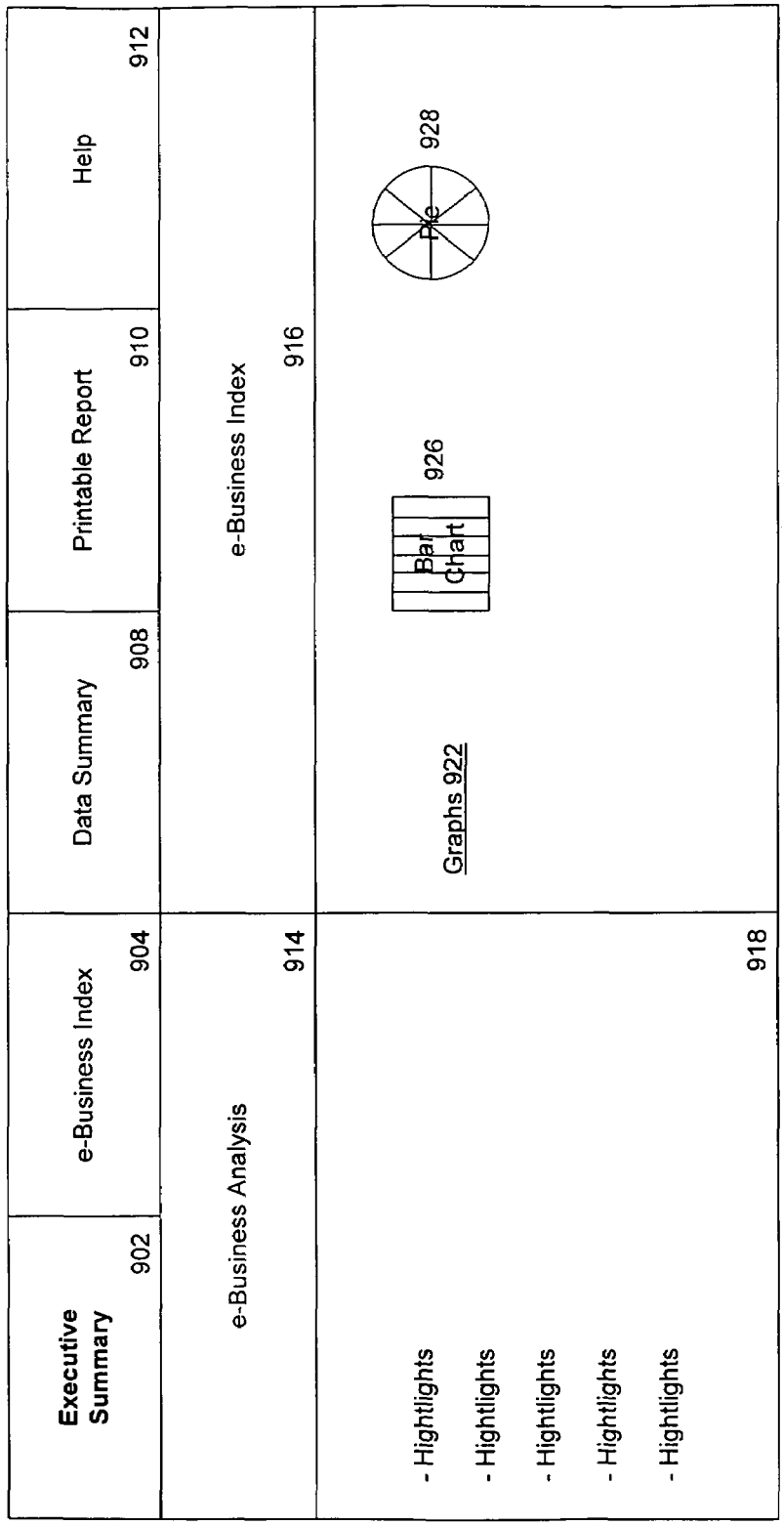

FIG. 9 shows an output report page 900 according to an embodiment of the invention. Output report page 900 is a report page that can be tailored to a specific entity or entities. Executive summary link 902, e-business index link 904, data summary link 908, printable report link 910, and help link 912 can be buttons, links, hot spots or the like. These links provide access to various report styles. For example, executive summary link 902 might display highlights field 918 of an analysis field 914 and index field 916. These highlights field 918 might display a series of statements and URLs. The content provided in report page 900 provides any one of users 140 with information regarding the operations, perceptions and situations of any entity.

Additionally, report page 900 includes a graphs section 922 with an example bar chart field 926 and an example pie chart 928. Bar chart 926 indicates the different form(s) of the entity's content which have been found on Web sites 106 and the frequency of such findings for a particular search. The columns in bar chart 926 include such parameters as the frequency of audio, video, graphic, text, logo, and type of content, that the e-commerce competition system 100 has found within the Web sites 106. These metrics are available for reporting because page processing module 110 (during the page scoring step 316) extracts the necessary information from the downloaded pages.

Pie chart 928 indicates the types of Web sites 106 (i.e., the commercial or private purpose of the sites) and the frequency of such types for a particular search. Pie chart 928 presents the metrics displaying the frequencies, while a legend explains the types of pages.

It should be noted that the particular metrics appearing in the output pages of the e-commerce competition system 100, result from the entity's e-commerce needs. Thus, it will be apparent to one skilled in the relevant art(s) that the search criteria defined in steps 304 and 310 dictate the information that will be extracted from the pages of the URLs during operation of the e-commerce competition system 100. The search criteria also dictate the types of queries page processing module 110 will make of the relational database 120 during the generate report step 330.

FIGS. 10A–D show additional output report pages according to an embodiment of the invention. Output report page 1000A shows a listing of index categories 1014. The index lists field 1018 which correspond to the criteria use to form score words and formulae. Index listing field 1016 provides access to component groups field 1020. Groups field 1020 provide textual and graphical feedback based on an aggregate of the results of index lists of field 1018. For example, the links to site component group field 1020 may contain components of field 1018 which score pages based on whether the link was from a commerce site, portal or news site, a top 50 site, etc. In one embodiment, the index listings contain absolute numbers and entities are compared based on these absolute numbers. In another embodiment, the index listings contain normalized values which provide each entities with a value in relation to a determined baseline.

Output report page 1000B shows a listing of index categories 1014 with components 1018. Additionally, output report page 1000B shows an overall score field 1036 displaying graph sections 1037. Graph sections 1037 might display an entity's overall score versus that of any number of peers and/or a baseline of other entities with a presence on the computer network. Output report pages 1000C and 1000D show similar information which may be more specific, as with metatag use field 1046, or more general, as with historical use field 1056.

VIII. Front-End and Back-End Severability

In one embodiment of the invention, the front-end and back-end of the e-commerce competition system 100 are constructed so that they may operate independently of each other. The practical implications of this is that the front-end is able to provide uninterrupted ("24 hours a day and 7 days per week") service to view archived data (i.e., contents of offending sites), while the back-end is either unavailable or focusing on a different subset of clients. Because the front-end is the entire GUI to use the e-commerce competition system 100 (and thus, controls the activities of the back-end), it possesses code logic to not only communicate with page processing module 110 applications via HTTP, but also utilize a message queuing system to leave "messages" when the back-end is unavailable due to failure, maintenance, upgrades, etc. This may be implemented by using the database 120 to log commands, which page processing module 110 may "pick-up" when it returns online. The same queuing system is utilized to queue commands from the plurality of users 140. Furthermore, the DHTML pages of the Web server 125 allow certain user functions (e.g., user validation) to occur entirely on the front-end, thus improving the performance of page processing module 110 back-end.

In an embodiment of the invention, internal users of the e-commerce competition system 100 (for security reasons) have access to the page processing module 110 via the HTTP communication link between the Web clients 140 and the page processing module 110, as shown in FIG. 2. This is a faster communications link to the page processing module 110 because the Web server 125 and database 120 are bypassed. Consequently, messages sent to the page processing module 110 back-end via this path are not queued, but executed directly without waiting. This path may be used to send commands needing immediate effect (e.g., turn on/off or modifying search variables in real-time).

IX. Environment

Figure 11:
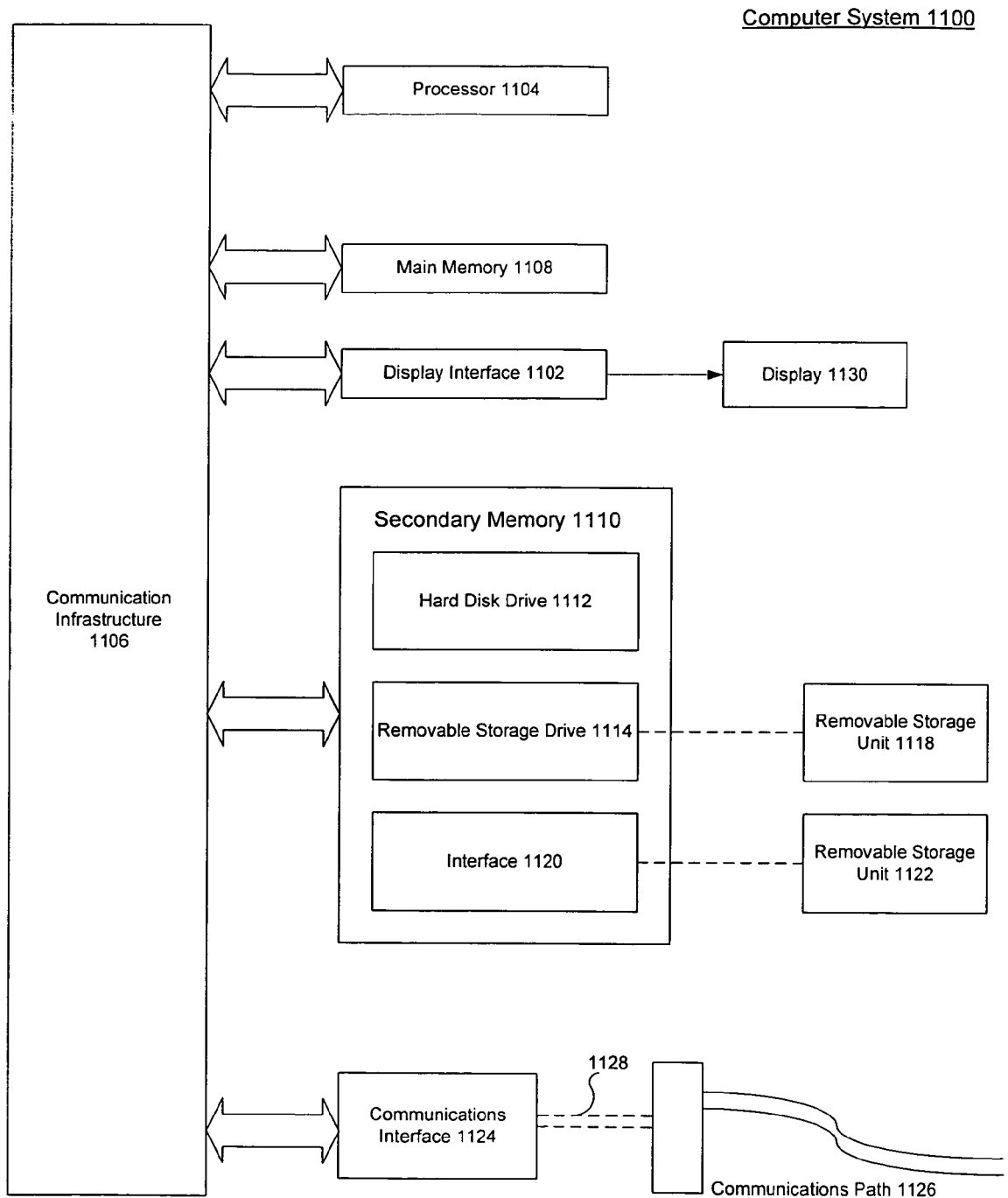
FIG. 11 is a block diagram of an exemplary computer system useful for implementing the invention.

The present invention (i.e., e-commerce competition system 100 or any part thereof) may be implemented using hardware, software or a combination thereof and may be implemented in one or more computer systems or other processing systems. In fact, in one embodiment, the invention is directed toward one or more computer systems capable of carrying out the functionality described herein. An example of a computer system 1100 is shown in FIG. 11. The computer system 1100 includes one or more processors, such as processor 1104. The processor 1104 is connected to a communication infrastructure 1106 (e.g., a communications bus, cross-over bar, or network). Various software embodiments are described in terms of this exemplary computer system. After reading this description, it will become apparent to a person skilled in the relevant art(s) how to implement the invention using other computer systems and/or computer architectures.

Computer system 1100 can include a display interface 1102 that forwards graphics, text, and other data from the communication infrastructure 1106 (or from a frame buffer not shown) for display on the display unit 1130.

Computer system 1100 also includes a main memory 1108, preferably random access memory (RAM), and may also include a secondary memory 1110. The secondary memory 1110 may include, for example, a hard disk drive 1112 and/or a removable storage drive 1114, representing a floppy disk drive, a magnetic tape drive, an optical disk drive, etc. The removable storage drive 1114 reads from and/or writes to a removable storage unit 1118 in a well known manner. Removable storage unit 1118, represents a floppy disk, magnetic tape, optical disk, etc. which is read by and written to by removable storage drive 1114. As will be appreciated, the removable storage unit 1118 includes a computer usable storage medium having stored therein computer software and/or data.

In alternative embodiments, secondary memory 1110 may include other similar means for allowing computer programs or other instructions to be loaded into computer system 1100. Such means may include, for example, a removable storage unit 1122 and an interface 1120. Examples of such may include a program cartridge and cartridge interface (such as that found in video game devices), a removable memory chip (such as an EPROM, or PROM) and associated socket, and other removable storage units 1122 and interfaces 1120 which allow software and data to be transferred from the removable storage unit 1122 to computer system 1100.

Computer system 1100 may also include a communications interface 1124. Communications interface 1124 allows software and data to be transferred between computer system 1100 and external devices. Examples of communications interface 1124 may include a modem, a network interface (such as an Ethernet card), a communications port, a PCMCIA slot and card, etc. Software and data transferred via communications interface 1124 are in the form of signals 1128 which may be electronic, electromagnetic, optical or other signals capable of being received by communications interface 1124. These signals 1128 are provided to communications interface 1124 via a communications path (i.e., channel) 1126. This channel 1126 carries signals 1128 and may be implemented using wire or cable, fiber optics, a phone line, a cellular phone link, an RF link and other communications channels.

In this document, the terms "computer program medium" and "computer usable medium" are used to generally refer to media such as removable storage drive 1114, a hard disk installed in hard disk drive 1112, and signals 1128. These computer program products are means for providing software to computer system 1100. The invention is directed to such computer program products.

Computer programs (also called computer control logic) are stored in main memory 1108 and/or secondary memory 1110. Computer programs may also be received via communications interface 1124. Such computer programs, when executed, enable the computer system 1100 to perform the features of the present invention as discussed herein. In particular, the computer programs, when executed, enable the processor 1104 to perform the features of the present invention. Accordingly, such computer programs represent controllers of the computer system 1100.

In an embodiment where the invention is implemented using software, the software may be stored in a computer program product and loaded into computer system 1100 using removable storage drive 1114, hard drive 1112 or communications interface 1124. The control logic (software), when executed by the processor 1104, causes the processor 1104 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

X. Conclusion

While various embodiments of the invention have been described above, it should be understood that they have been presented by way of example, and not limitation. It will be apparent to persons skilled in the relevant art that various changes in form and detail may be made therein without departing from the spirit and scope of the invention. This is especially true in light of technology and terms within the relevant art(s) that may be later developed. Thus the invention should not be limited by any of the above-described exemplary embodiments, but should be defined only in accordance with the following claims and their equivalents.

What is claimed is:

1. A method for analyzing a e-commerce competition of an entity, comprising the steps of:
   (1) collecting pages that are commonly transmitted over a computer network;
   (2) collecting external data not directly retrievable from said pages;
   (3) classifying said pages using said external data and said pages according to a series of predetermined entity-specific metrics defining information relevant to the entity;
   (4) measuring a number of occurrences that each of said pages falls within each of said series of predetermined entity-specific metrics, wherein said measuring step comprises:
      parsing content of said pages using predetermined categories of key words;
      searching for at least one key word in the predetermined categories; and
      scoring a subset of said pages utilizing at least one key word and analyzed statistics based on an amount of key words found on a page;
   (5) comparing said number of occurrences that each of said pages falls within each of said series of predetermined entity-specific metrics to a predetermined n-list of values for each of said series of predetermined entity-specific metrics; wherein said n-list represents a selective sampling in order to compare the entity;
   (6) delivering a benchmark for the entity based on (5);
   (7) repeating steps (1)–(6) to obtain a list of benchmarks for other entities; and
   (8) generating a report comparing said benchmark with said list of benchmarks, wherein said report compiles the analyzed statistics from said pages and prioritizes said pages utilizing the predetermined entity-specific metrics to combine said analyzed statistics and said external data.

2. The method of claim 1, wherein said computer network is the global Internet.

3. The method of claim 1, wherein said computer network is an intranet.

4. The method of claim 1, wherein said computer network is an extranet.

5. A system for analyzing a e-commerce competition of an entity, comprising:
   a downloader for searching a computer network, wherein said computer network contains content commonly transmitted over a computer network;
   a page processing module coupled to said downloader for receiving pages downloaded from a search on said computer network, said page processing module identifying a subset of downloaded pages;
   an archive module coupled to said page processing module for storing said subset',
   a processing module for collecting external data not directly retrievable from said pages;
   an archive for storing data from the page processing module, the archive module, and the processing module;
   a scoring module for classifying said pages using said external data and said pages according to a series of predetermined entity-specific metrics defining information relevant to the entity, which are a result of: parsing content of said pages using predetermined categories of key words; searching for at least one key word in said predetermined categories: and scoring said subset utilizing at least one key word and analyzed statistics based on an amount of key words found on a page; and
   a database for allowing said scoring module to measure a number of occurrences and compare the number of occurrences that each of said pages falls within each of said series of predetermined entity-specific metrics to a predetermined n-list of values for each of said series of predetermined entity-specific metrics; wherein said n-list represents a selective sampling in order to compare the entity in order to produce a report;

wherein said report delivers a benchmark for each entity and compares benchmarks by compiling said analyzed statistics from said pages prioritized utilizing metrics defining information relevant to the entity; and prioritizing said pages utilizing said metrics to combine said analyzed statistics and said external data;

wherein said report is utilized to compare an entity's presence to at least one competitor's presence on said computer network.

6. The system of claim 5, wherein said computer network is the global Internet.

7. The system of claim 5, wherein said computer network is an intranet.

8. The system of claim 5, wherein said computer network is an extranet.

9. The system of claim 6, further comprising:

a plurality of Web clients that provide a graphical user interface for a user to enter search criteria and communicate with said downloader, thereby controlling said page processing module.

10. A computer program product comprising a computer usable medium having computer readable program code means embodied in said medium for causing an application program to execute on a computer that develops and interprets e-commerce metrics of an entity, said computer readable program code means comprising:

first computer readable program code means for causing the computer to collect pages that are commonly transmitted over a computer network;

second computer readable program code means for causing the computer to collect external data not directly retrievable from said pages;

third computer readable program code means for causing the computer to classify said pages using said external data and said pages according to a series of predetermined entity-specific metrics defining information relevant to the entity;

fourth computer readable program code means for causing the computer to measure a number of occurrences that each of said pages falls within each of said series of predetermined entity-specific metrics, wherein said measuring step comprises:

fifth computer readable program code means for parsing content of said pages using predetermined categories of key words; searching for at least one key word in the predetermined categories; and scoring a subset of said pages utilizing at least one key word and analyzed statistics based on an amount of key words found on a page;

sixth computer readable program code means for causing the computer to compare said number of occurrences that each of said pages falls within each of said series of predetermined entity-specific metrics to a predetermined n-list of values for each of said series of predetermined entity-specific metrics; wherein said n-list represents a selective sampling in order to compare the entity, seventh computer readable program code means for causing the computer to deliver a benchmark for the entity based on the fifth computer readable program code means;

eighth computer readable program code means for repeating steps performed by said first to said seventh computer readable program code means to obtain a list of benchmarks for other entities; and ninth computer readable program code means for generating a report comparing said benchmark with said list of benchmarks, wherein said report compiles the analyzed statistics from said pages and prioritizes said pages utilizing the predetermined entity-specific metrics to combine said analyzed statistics and said external data.

11. The computer program product of claim 10, wherein said computer network is the global Internet.

* * * * *